United States Patent [19]
Saul, Jr. et al.

[11] 3,945,510
[45] Mar. 23, 1976

[54] STORAGE EQUIPMENT

[75] Inventors: Samuel Saul, Jr., Pittsburgh; Thomas D. Colbridge, Chalkhill, both of Pa.

[73] Assignee: Rack Engineering Company, Connellsville, Pa.

[22] Filed: Feb. 15, 1973

[21] Appl. No.: 332,892

Related U.S. Application Data

[62] Division of Ser. No. 187,608, Aug. 8, 1971, Pat. No. 3,743,115.

[52] U.S. Cl............................. 214/16.4 A; 211/162
[51] Int. Cl.$^2$.......................................... B65G 1/06
[58] Field of Search......... 214/16.4 R, 16 B, 16.4 A

[56] References Cited
UNITED STATES PATENTS

| | | | |
|---|---|---|---|
| 1,317,776 | 10/1919 | Claus | 214/16.4 A |
| 1,824,201 | 9/1931 | Eisenberg | 214/16.4 A |
| 2,811,240 | 10/1957 | Fenton | 214/16.4 R |
| 3,016,973 | 1/1962 | Williamson | 214/16.4 A |
| 3,138,266 | 6/1964 | Fahey et al. | 214/16.4 A |
| 3,757,967 | 9/1973 | Colbridge | 214/16.4 R |

Primary Examiner—Robert G. Sheridan
Assistant Examiner—R. B. Johnson
Attorney, Agent, or Firm—Parmelee, Miller, Welsh & Kratz

[57] ABSTRACT

A multi-shelf storage rack having spaced shelf-supporting uprights arranged in pairs, each pair has a front and a rear upright, the uprights having two rows of vertical notches extending vertically thereof in which the shelves are supported. The shelves have a pair of transverse rails extending from the front to back with a stop at the back. A wheeled dolly is positioned on these rails and the dolly has a spring-biased latch pin that restrains it against movement on the rails. An outrigger, can be hung on the uprights in position in front of a selected shelf, secured against accidental removal whereupon a latch pin-releasing device on the outrigger may be operated to release the latch pin on the dolly and the forward end of the dolly rolled from the rails on the shelf onto matching rails on the outrigger to a position where the dolly is exposed vertically for loading or unloading by a crane or hoist. When loading or unloading is completed, the dolly is rolled back onto the shelf and an inclined ramp on the outrigger retracts the latch pin on the dolly until the dolly is back on the shelf when the latch pin will spring into latching position. The outrigger is thereafter lifted off the rack by the crane or hoist and placed on the floor or hung in front of another shelf.

6 Claims, 12 Drawing Figures

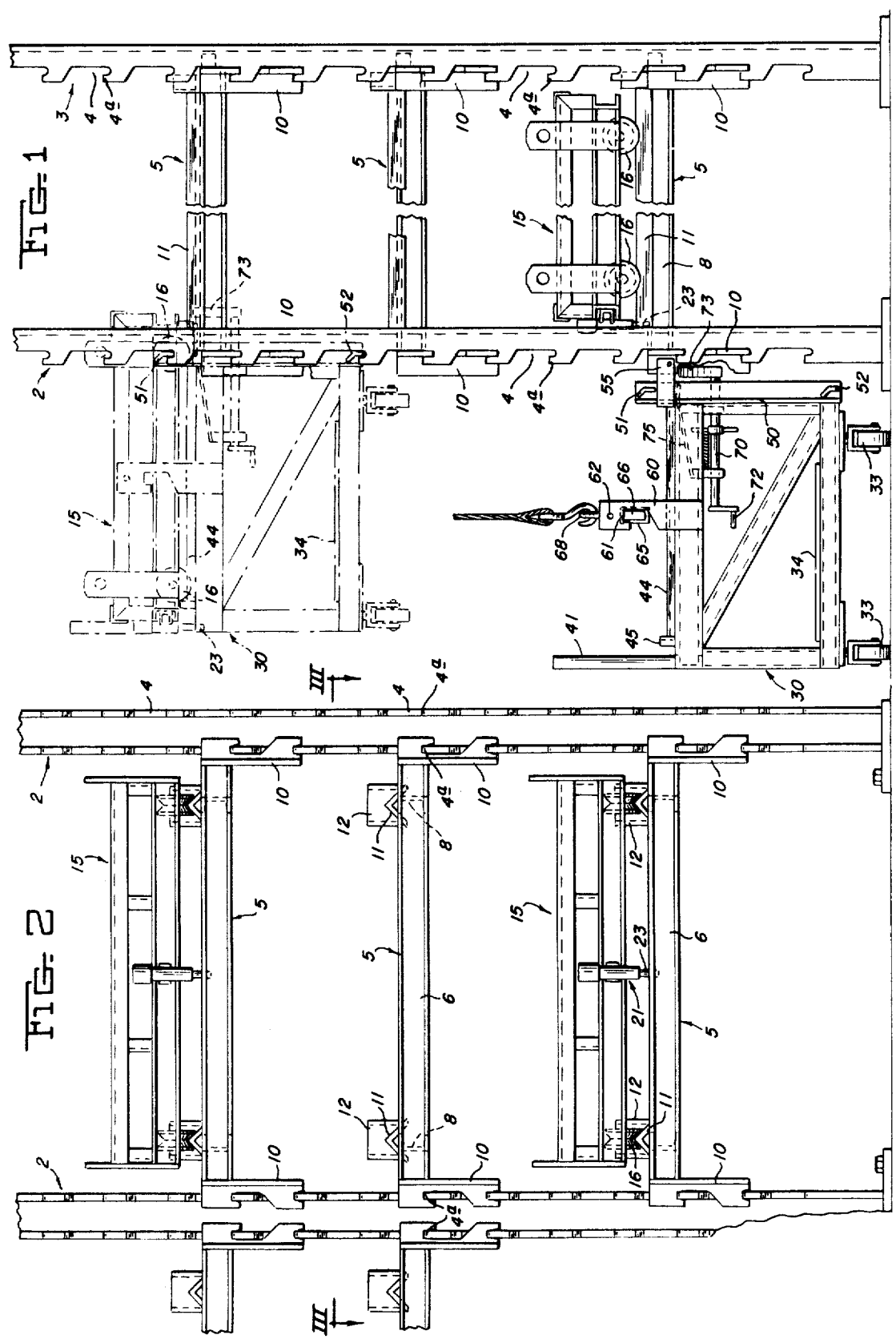

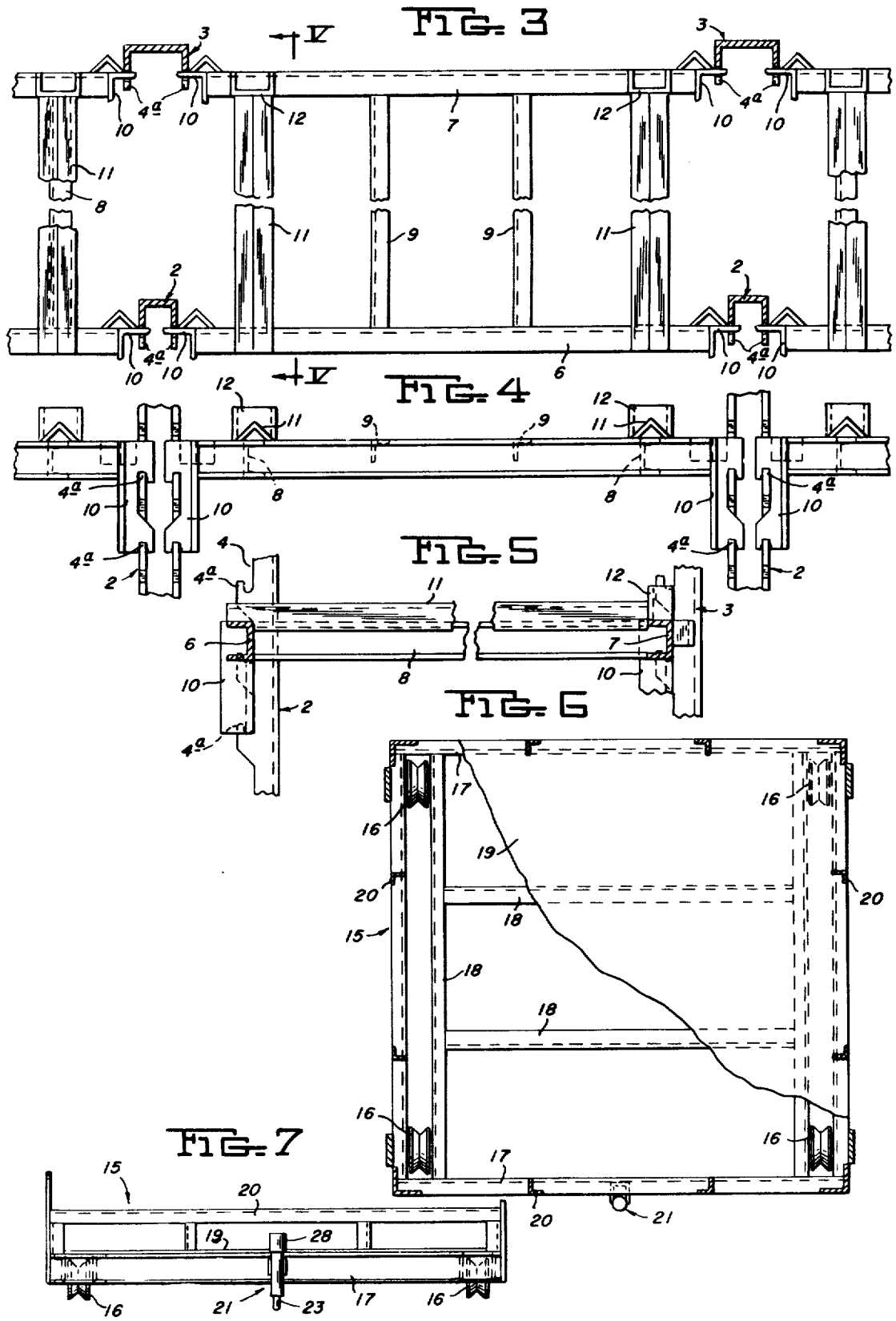

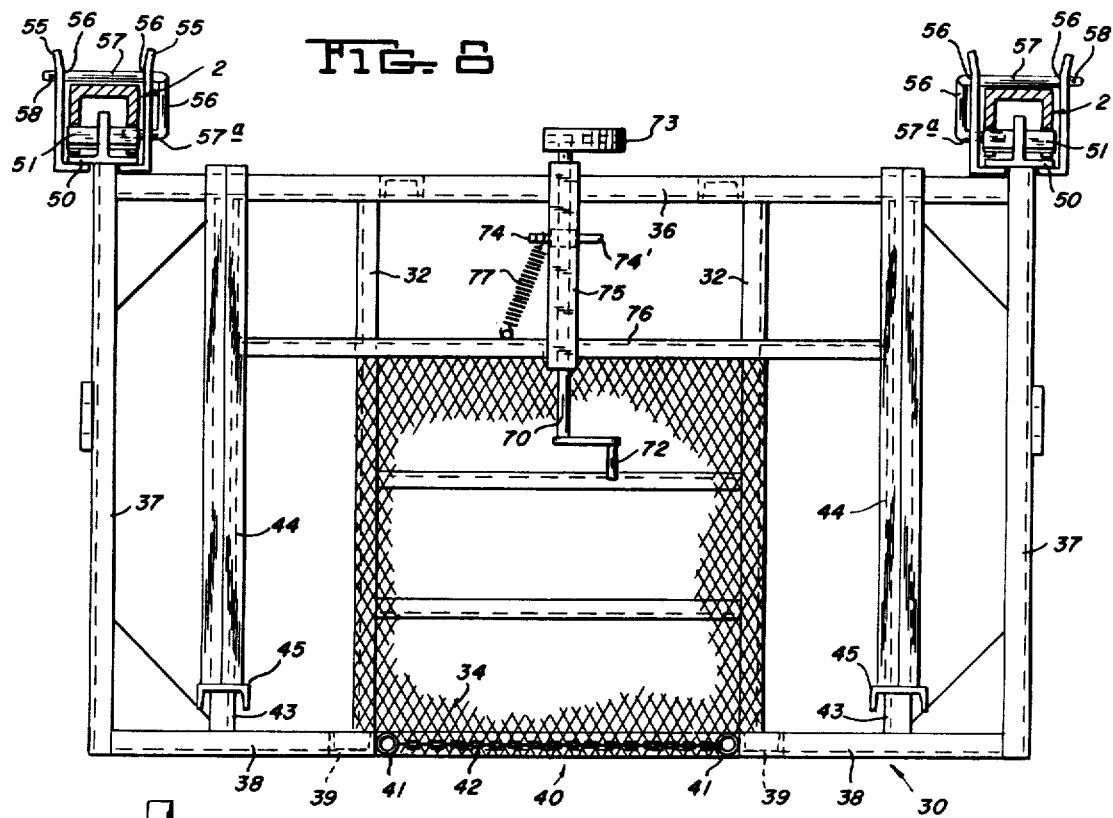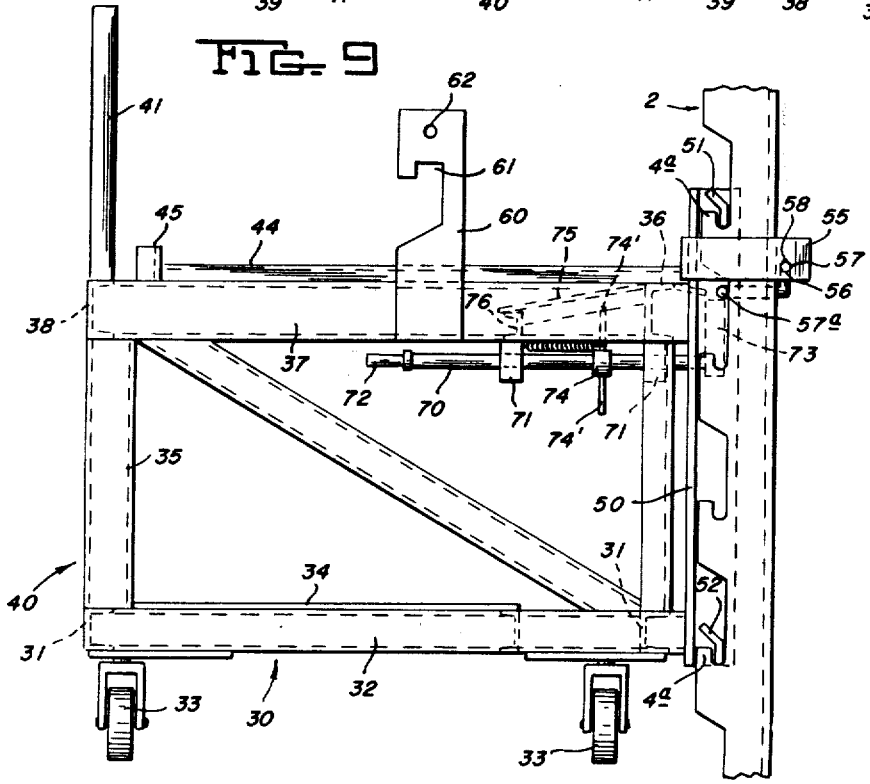

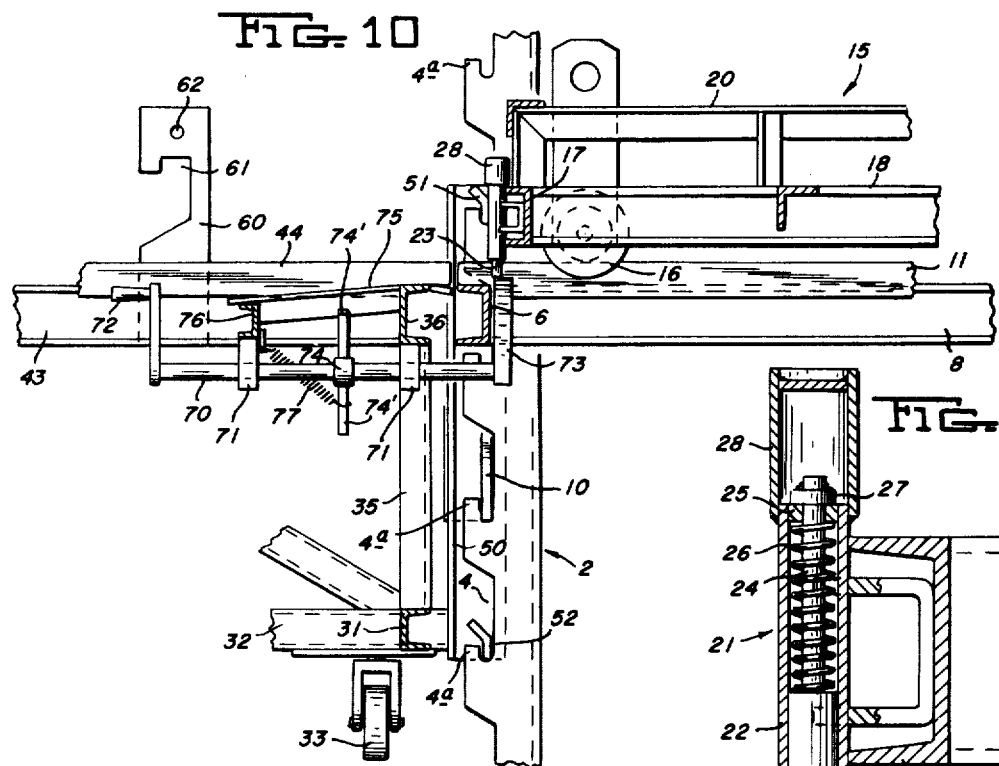
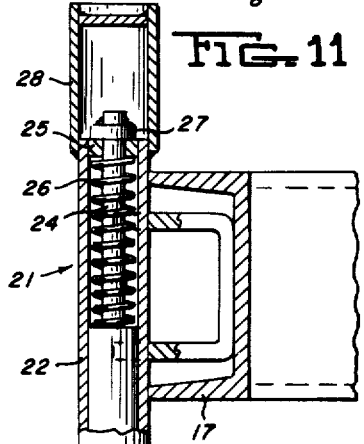
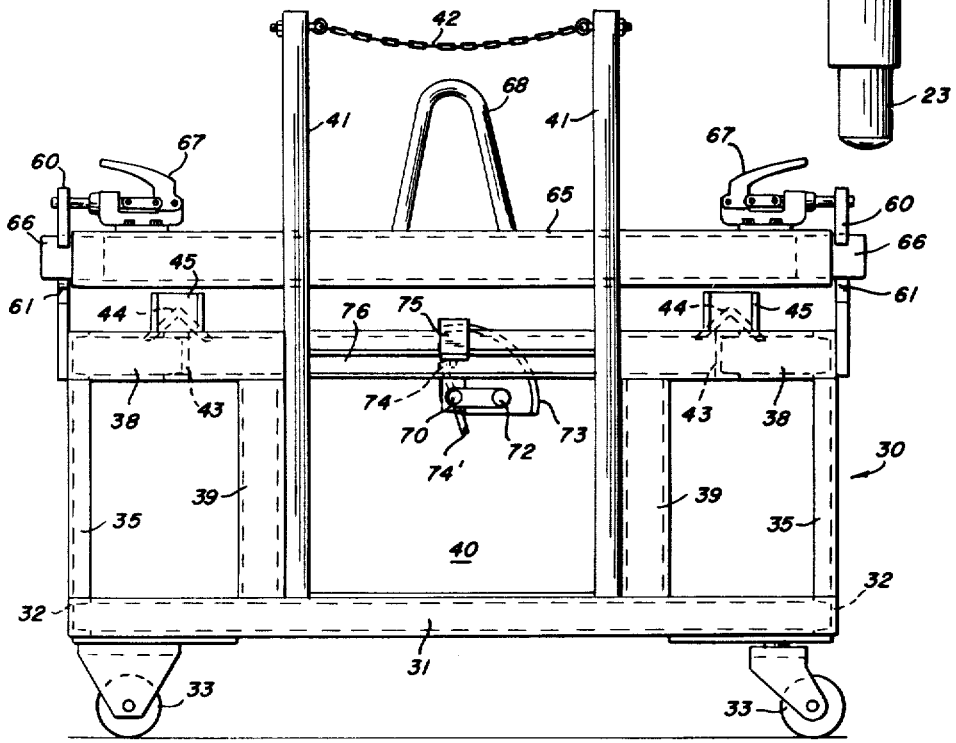

STORAGE EQUIPMENT

This is a division of application Ser. No. 187,608, filed Oct. 8, 1971 now U.S. Pat. No. 3,743,115.

This invention relates to material storage equipment for use particularly in industries and other places where heavy loads are placed on and removed from multi-shelved racks by the use of an overhead traveling hoist or crane.

In many manufacturing industries, as well as elsewhere, storage racks are provided which are typically but not necessarily from twelve to twenty feet in height, with notched front and rear uprights at regular intervals that support adjustable shelves. Commonly there may be two or more rows of such racks in parallel relation with an aisle between each two confronting racks. The shelves to which this invention relates are used for the most part to store heavy articles, such for example as spare or replacement parts for machinery used in a manufacturing operation, heavy die blocks, or even inventory of parts used in the assembly of products or completed inventory of manufactured articles. In other instances, such storage racks may be used in warehouses and storerooms of various kinds. In any event, the articles placed on the shelves are frequently of a nature that require, or at least make advantageous, the use of an overhead traveling crane or hoist for bringing articles to or carrying them from the storage racks as distinguished from placing the load on a pallet and putting it into place or removing it from the shelf with a fork lift truck. However, the cranes can only effectively lift or lower a load vertically, but cannot, in most cases maneuver a heavy article into a selected shelf or remove it from the shelf where there are one or more shelves above it, especially if the shelves, as is usually the case, are at most only two or three feet apart. Considerable manual labor and time, therefore, may be required for the placing of an article or load on a shelf or removing it therefrom. Moreover, it is an operation not free of danger to a workman who may be on a ladder trying to swing the load into place.

It has heretofore been proposed to provide track-forming rails on each shelf, with each shelf having a wheeled dolly movable on said rails. Removable bridge bars are put in place extending from a shelf on one side of the aisle to a shelf on the other side, and the dolly may be rolled from the tracks on the shelf onto matching rails on the bridge bars whereupon the overhead hoist may lower a load onto the dolly or lift a load therefrom after which the dolly is rolled back into position on the shelf. Often loads of as much as a ton or more are handled in this way, but this procedure has several drawbacks. One drawback is that the positioning of the columns and the level of the shelves on each side of the aisle must be matched so that the bridge bars will be level, and another drawback is that there may be a row or rows of shelving where there is no confronting row of shelves on which such bridge bars can be rested. In addition, there is a safety hazard because if a dolly is not properly restrained on the shelf or is prematurely released the dolly may roll off the shelf resulting in considerable damage and possible injury to a worker.

The present invention is designed to overcome these dangers and shortcomings and provide a space-saving storage system where heavy loads can be placed on or removed from the storage rack shelves with greater facility and safety and without regard as to whether one row of shelving confronts another or whether the shelves and columns at one side of the aisle are directly across from each other or are at the same level.

According to our invention there is provided an outrigger that may be wheeled along the shop floor to a selected position, then lifted with the crane or hoist to the level of the shelf to be loaded or unloaded and hooked into the notched uprights at each end of the selected shelf. In this operation a workman will generally ride up on the outrigger and immovably secure it in position on the columns. Once the outrigger is secured on the rack the crane or hoist is disconnected. The outrigger has rails on the top thereof that will align with rails on the shelf. The dolly has an interlocking latching engagement with the shelf that can be released only when the outrigger is in place, so that the dolly cannot roll forward until at least a considerable portion of it is positioned over and supported by the outrigger after this safety interlock has been released. The latching means snaps back into restraining position when the dolly is rolled from the outrigger back onto the shelf.

The outrigger is preferably provided with means to limit the travel of the dolly to a position where the major portion of the area of the dolly is clear for the placing of a load thereon or removing a load therefrom but the wheels at the inner end of the dolly will not move off the shelf. Thus, part of the weight of the load is always supported vertically in the rack structure and part of it is transmitted to the columns as lateral components of thrust and tension to prevent overstressing of the rack structure.

During the actual transfer of the load to or from the hoist to the dolly the workman will be on a safety ladder adjacent the outrigger at a location where he can secure or release the hooks or sling connecting the load and the hoist.

The invention may be fully understood by reference to the accompanying drawings showing a preferred embodiment of our invention and in which:

FIG. 1 is an end view of a storage rack showing the outrigger in full lines on the floor at the base of the rack, while the drawing also shows the outrigger in phantom lines at an elevated position on the rack.

FIG. 2 is a front elevation of a portion of rack with several shelves and with a dolly on each of two of the shelves.

FIG. 3 is a horizontal section in about the plane of line III—III of FIG. 2 but on a larger scale.

FIG. 4 is a fragmentary front view of FIG. 3.

FIG. 5 is a transverse fragmentary vertical section in the plane line V—V of FIG. 3.

FIG. 6 is a plan view of the dolly but with portions thereof broken away to better disclose the structure.

FIG. 7 is a front view of the dolly shown in FIG. 6.

FIG. 8 is a plan view of the outrigger showing it attached to the front columns of the rack, these columns being shown in section and the rack shelf and the dolly are omitted for better illustration.

FIG. 9 is an end elevation of FIG. 8.

FIG. 10 is a fragmentary vertical section on a larger scale showing a portion of the outrigger attached to the front column of the rack with portions of the shelf and dolly.

FIG. 11 is a fragmentary side elevation on a larger scale and partly in section of the safety locking pin on the dolly.

FIG. 12 is a front elevation of the outrigger with the removable lifting bar, by which the outrigger is hoisted into place.

Referring to the drawings, the rack structure itself may take several different forms, the one here shown being generally similar to that shown in U.S. Pat. No. 2,729,342 granted Jan. 3, 1956 to Samuel Saul, Jr. one of the present inventors.

The rack has spaced vertical front supporting posts 2 and spaced directly behind them are rear posts 3. Each post has two vertical rows of notches 4 therein providing hook-like projections 4a between each two notches. There are two rows of notches so that each pair of one front and one rear upright will support one end of each of two shelves, as is well understood in the art.

The shelves are designated generally as 5 and in a given installation it is desirable that any shelf be interchangeable with any other shelf. The shelves each have a structured section 6 across the front, preferably a channel section with the web vertical and the flanges turned toward the frontof the rack. There is a similar section 7 at the back of the shelf. There are transverse sections 8 extending from front to rear near each end of the shelf and intermediate sections 9 also extending from front to rear. At each corner of the shelf there is a mounting structure 10 adapted to be fitted and hooked into the notches and hooks of the uprights to hold the shelves in place and restrain them against lateral or fore and aft movement. Each mounting structure 10 is constructed to engage in two notches on the upright with which it is hung. Each shelf may therefore be set in the upright at any selected elevation, all as described in said U.S. Pat. No. 2,729,342.

Each shelf with which the present invention is particularly concerned also has apair of rails 11 preferably in the form of inverted angle sections positioned over the sections 8 near each end of the shelf. Each rail 8 has its front end extending across the top of the front channel section 6 (see FIG. 3) but at its rear end there is a stop member 12 to prevent the hereinafter described dolly from rolling off the shelf at the back, so that the rail 11 stops forwardly of the rear structural shelf section 7. The stop 12 is positioned above said section at the end of each rail. Since all shelves are interchangeable the rails on all shelves which are provided with rails are the same and are spaced the same distance apart. It may be, however, that in some installations some of the shelves may not be equipped with rails 11 where it may be more convenient to merely place a loaded pallet on some particular shelf or shelves, especially the lower ones that can be loaded or unloaded with a fork lift truck. The present invention is used where at least some if not all of the shelves have rails and stops, as here provided.

Each shelf that is equipped with the rails 11 is designed to receive a dolly, designated generally as 15 which has four grooved wheels 16 on the underside thereof, one near each corner and with the front and back wheels at each side of the dolly in alignment, so that one pair of front and back wheels will ride on one rail 11 and the other pair on the other rail and the V-shaped groove in the peripheries of the wheels will guide the dolly on the inverted V-shaped rails 11. Each dolly, as best seen in FIG. 6 has a frame of structural sections 17 and 18, the sections 17 being at the front and rear of the dolly and 18 designates the other sections. There is a deck plate 19 over the bed of the trolly and it is desirably surrounded by front, rear, and side wall structures 20 for assuring that articles or loads placed on the dolly cannot slide off the deck of the trolley.

At the center of the front cross member 17 of the dolly there is welded a latch pin assembly designated generally as 21 as shown in FIG. 11. It comprises a vertical barrel 22 having a slidable latch pin 23 projecting from its lower end. The pin has an upwardly extending stem 24 that passes through an abutment or disk 25 fixed in the upper end of the barrel. There is a compression spring 26 in the barrel around the stem confined between the top of the pin 23 and the disk 25 to resiliently urge the pin to a fully projected position while a stop 27 on the inner or upper end of the stem 24 limits the outward movement of the pin, which, however, may be pressed inwardly against the pressure of the spring. The spring is desirably a strong spring, so strong in fact that a workman cannot press the pin in with his hands, or at least not without great effort. There is an end piece 28 at the top of the barrel welded to the barrel so that one cannot tamper with the latch pin or spring from the upper end of the assembly.

The latch pin is so positioned on the cross member 17 that when the dolly is pushed onto the shelf against the stops 12 at the rear ends of the rails 11 the latch pin will project down below the top of the front shelf rail 6 and thereby prevent the accidental removal of the dolly from the shelf. It is only possible to remove the dolly by raising the latch pin high enough to clear the top of the shelf section 6 and this, for all practical purposes cannot be done by one trying to push the pin up with his hand.

The third element of the combination is the outrigger itself. It is designated generally as 30 and has a structural frame of a width substantially equal to the width of the shelf in an end-to-end direction, that is, at least equal to the distance required to reach from a row of hooks and notches on one column to a row of hooks and notches on an adjacent column. There is a rectangular base frame of structural sections including front and rear sections 31 and for and aft sections 32 at the ends and intermediate the ends. There are casters 33 at each corner of the base at least two of which swivel, as indicated in the drawing. The central area of the front of the base has a platform 34 thereon which is desirably formed of expanded metal (see FIG. 8) on which a workman may stand.

At each corner of the base there is a corner post 35 which supports an upper frame structure comprising an elongated rear section 36, end sections 37, front sections 38, each of which extends from a front corner post 35 to an upright 39 leaving an entrance at 40 through which a workman may step onto the platform 34. There are desirably tubular posts 41 at each side of this entrance onto which a workman may hold and a safety chain 42 may be hooked across the entrance, as indicated in FIGS. 1 and 12. There is other vertical and diagonal bracing, as indicated, between the upper and lower frames and the structure is welded to give it complete rigidity. Spaced inwardly from each end of the upper frame are horizontal struts 43 that extend from the backsection 36 to one of the front sections 38 and there are rails 44, similar to the rails 11 on the shelves, mounted on each of these struts. These rails extend from the rear edge of the upper elongated section 36 to a stop element 45, similar to the elements 12, and they are located at the front ends of the rails 44. The spacing and location of the rails 44 on the outrigger is such that when the outrigger is hung on the front of the rack for cooperation with a selected shelf, as hereinafter described, the rails 44 of the outrigger will be in exact alignment with the rails 11 on the selected shelf and, in effect, then provide a continuation of the rails 11.

There is welded to each rear corner of the outrigger a mounting piece 50 for hanging the outrigger on two front columns of the rack structure. This mounting piece as here shown is a structural T-section with the leg of the T projecting to the rear. Near its upper end it has a short bar 51 of a slightly angled section passing therethrough and rigidly welded thereto. Near the lower end of the leg of the T-section there is a second similar cross bar 52. The vertical spacing between these two bars or cleats 51 and 52 from the lower edge of one to the lower edge of the other exactly corresponds to the distance from the bottom of one notch 4 in the upright 2 to the bottom of the fourth notch below it, as shown in FIG. 9, that is, the edge-to-edge distance is a multiple of the center-to-center distance between notches on the uprights, so that when the outrigger is brought to a proper level to align the rails 44 with the rails 11 on the shelf the cross bars or cleats 52 will engage the bottoms of two spaced notches in the uprights. Moreover, as seen in FIG. 8 the cleats project from each side of the leg of the T-section far enough to engage in the corresponding notches of both vertical rows of notches on the same column so that the load or stress on each cleat is exerted against two hooks on the column.

At each top rear corner of the outrigger there is a yoke comprised of two rigid arms 55 the free terminal portions of which curve slightly away from each other. Each yoke straddles one of the upright columns (See FIGS. 8 and 9) as the outrigger is moved by a hoist into position to be hung on the columns and aids in guiding the cleats 51 and 52 into the notches of the upright columns and exactly aligning the rails on the outrigger with those on the shelf.

There are aligned holes 56 in the terminal portions of the two arms 55. There is a removable safety device best seen in FIG. 8 in the form of an angled connecting bar with a long pin 57 at one end thereof and a short pin 57a at the other end, the two pins being parallel. When the outrigger is in place, a workman standing on the platform of the outrigger holding the connecting bar inserts the long pin of the safety pin device through the aligned holes 56 in the two arms of the yoke at one end of the outrigger while the short arm passes through the formed notch portion 4 in the upright just under one of the hooks 4a. The operation is repeated with a second safety device at the other corner. The long pin of the safety device forms a tie between the two arms of the yoke at the back of the upright of the rack so that the outrigger cannot pull away from the upright so long as the safety device is in place, and the short pin 57a being rigidly connected to the first will enter the notch below the yoke and wedge against the under surface of the hook 4 beneath which it is located and prevent the yoke and outrigger from being accidentally raised or lifted to a level where the cleats 51 and 52 could move up in the notches in which they are engaged, or even to a level that would lift the track rails of the outrigger above the level of the track rails on the shelf There is usual type of spring ball detent in the free end of the longer pin member 57 at 58 to prevent accidental displacement of this safety element.

For lifting the outrigger from the floor to the shelf level at which it is to be used there is a lifting extension 60 secured to and extending upwardly from each of the upper end sections 37 of the outrigger. Below its upper end each extension has an inverted hook-like notch 61 therein and above the notch the extension has a hole 62 therethrough. The extensions 60 are positioned at about the center of the end pieces 37 to which they are secured so that when the outrigger is being lifted as hereinafter described, it will stay nearly level but can be easily tilted to a slight extent by the workman on the platform shifting his weight.

There is a removable lifting bar 65 of rectangular section with reduced rectangular end portions 66 at each end. This bar is slightly longer than the distance from one lifting extension 60 to the other and the end portions of this bar can be slipped sideways under and up into the bight of the hook-like notches 61. Near each end of the top edge of the bar there is a toggle lever operated latching pin unit 67 of a well known type so positioned that when the lifting bar is in place the latching pin can be projected into the adjacent hole 62 of the lifting extension (See FIG. 12) and thus retain the lifting bar in position until the latching pins are retracted. At the center of the lifting bar there is a lifting bail 68 into which the lifting hook of a crane or hoist can be engaged.

After the outrigger has been secured in place in front of a selected shelf and the lifting bar 65 has been released and carried away by the hoist, it is necessary to release the latch pin 21 from its locking position against the rear section 6 at the front of the shelf before the dolly can be moved forward onto the rails of the outrigger. For this purpose there is a shaft 70 mounted in bearings 71 below the level of the rails 44 and the rear top cross bar 36 of the outrigger (See FIG. 9). This shaft is slidable endwise in the bearings and also is rotatable and has a crank 72 at its forward end above the platform 34. The rear end of the shaft has a somewhat quadrant shaped eccentric cam 73 on its rear end. There is a hub 74 fixed on this shaft with two diametrically opposite spokes or arms 74' radiating therefrom, each of which is long enough to contact the depending leg of a downwardly and forwardly sloping T-section 75 (See FIG. 10) that has its top surface at one end flush with the top of the rear section 36 of the outrigger and its forward end resting on long frame member or bracing section 76 extending between the two struts 43 but the top of which is lower than the top of the rear rail 36. These spokes limit the arc through which the shaft 70 may rotate in either direction to 180° or slightly less because one will contact one side of the leg of the T-section 75 when the shaft rotates one direction and the other arm will strike the other side when the shaft is rotated in the opposite direction.

Finally, there is a spring 77 attached to one arm 74' and anchored to the frame member 76 and this spring resiliently restrains the shaft from sliding rearwardly and also biases the shaft to return to a position where the cam 73 is in the position shown in FIG. 8.

To release the latch pin 23 of the latch 21 so that the dolly may roll from the shelf onto the outrigger, the workman must push the crank toward the rear and then rotate it about 90° until the leading end of the cam contacts the end of the latch pin. Then the continued rotation of the cam will lift the latch pin against the pressure of spring 26 to a level where it just clears the shelf bar 6 and the dolly can then be pulled forward. As the pin 23 rides off the cam it slides across the top of the shelf section 6, then the top of the outrigger section 36 and then down the sloping top of the T-section 75 until it is again fully extended.

The stops 45 at the ends of the rails 44 are so positioned that the rear two wheels of the dolly will never roll off the rails 11 on the shelf, as shown in the phantom outline in FIG. 1, so that the outrigger is not required to support the full weight of the dolly and its load. This eliminates excessive overhang of the load at the front of the rack, but gives the dolly adequate exposure from above for loading or unloading it from a hoist.

After loading or unloading the dolly it is pushed back onto the shelf, and as it is pushed back, the top of the sloping T-section 75 will provide a ramp that will cam the latch pin 23 back up to a level where it will slide across the tops of the bars 36 and 6 and when the dolly is fully back the latch pin will snap down to its latching position.

From the foregoing it will be seen that the invention provides an outrigger construction that may be wheeled from one position to another over the floor or carried by a crane and then hoisted to a selected shelf with a workman riding up on the outrigger. The rack, the rack shelves, the dolly on the shelves and the outrigger all are designed for use together, and when the outrigger has been hung on the rack at the front of the selected shelf, the workman applies the safety devices to the yokes to immovably secure the outrigger against displacement. He also releases the hoisting bar 65 from the lifting extensions and the hoist takes it away. Operating the crank 72, the latch pin 23 on the dolly is released and the dolly is rolled out onto the outrigger until its forward travel is stopped by the stops 45. As a matter of safety, the workman will have moved to a safety ladder which has been brought into position. The crane or hoist will lift a load from or deposit a load onto the dolly and the dolly will be pushed back onto the shelf. As it moves back, the sloped ramp 75 will raise the latch pin 23 and it will snap into latching position when the dolly wheels contact the back stops 12. The workman may then get back onto the outrigger, remove the dual pin safety devices, attach the hoisting bar and the crane or hoist will remove the outrigger ot return it to the floor or to another shelf.

We claim:

1. For use with an adjustable pallet type storage rack having a series of equally spaced pairs of uprights each of which has two series of notches extending up the greater portion of its height and a series of spaced shelves extending between and supported by each two adjacent pairs of uprights, at least some of the shelves having spaced rails thereon extending in a front to back direction, and a dolly on at least some of said shelves with front and rear wheels guided on said rails means to releasably retain said dolly in a retracted position on said rails, the improvement comprising an outrigger adapted to be selectively raised up to and be supported on any two adjacent front uprights of the rack at the front of a selected shelf, said outrigger comprising:
   a. a generally rectangular structural frame having mounting means thereon arranged for interlocking engagement with the notches in two adjacent uprights by means of which the outrigger can be hung on two adjacent front uprights at a level in front of a selected one of said shelves and remain in position thereon without other means of support,
   b. spaced rails on the outrigger positioned to be aligned vertically and horizontally with the rails on the selected shelf when the outrigger is so hung on two front uprights, means on said outrigger to release a dolly in a selected one of said shelves whereby a dolly may be rolled from the rails on the shelf onto the rails of the outrigger,
   c. the outrigger having means thereon positioned in the path of travel of the dolly to limit the movement of the dolly on said outrigger to a position where the rear wheels of the dolly will remain on the rails on the shelf.

2. An outrigger as defined in claim 1 wherein there are two pairs of arms secured to the rectangular frame, each pair forming a yoke arrangement to straddle one of the uprights on which the outrigger is hung the arms of each yoke being of such length that their free terminal ends extend beyond the back surface of said columns, and a safety device for each yoke comprising a pin removably passed through said free terminal ends at the back of the upright which the arms of the yoke straddle to prevent the accidental removal of the outrigger from the uprights while the safety device is so positioned.

3. An outrigger as defined in claim 2 in which each safety device has a second pin joined thereto and parallel therewith positioned to enter the upper portion of one of said notches in the upright below the yoke to prevent accidental vertical movement of the outrigger on the uprights.

4. An outrigger as defined in claim 1 wherein the outrigger has a lower rectangular structure with a platform on which a workman may stand and an upper structure on which said rails are positioned and structural sections connecting said lower and upper structures.

5. An outrigger as defined in claim 1 in which the mounting means comprises two vertical sections, one near each end of the outrigger and located on that side thereof which is toward the rack on which the outrigger is to be hung, said sections each having an upper transverse cleat thereon positioned where it will engage the upright on which it is hung at a level above the selected shelf and another such cleat on said section at a level below said selected shelf.

6. An outrigger as defined in claim 1 in which there is a lifting hook at each end of the outrigger, a removable lifting bar extending across the top of the outrigger having its ends engaged under said hooks and having a lifting bail intermediate its ends, and manually operable latch means on the lifting bar releasably engaging said hooks for holding the lifting bar in position for lifting the outrigger until said latch means are manually released to effect removal of the lifting bar from the hooks.

* * * * *